May 7, 1968 P. GAY 3,381,509
DEVICES FOR TRANSMITTING A ROTARY MOTION TO A GEAR
Filed April 6, 1966 4 Sheets-Sheet 1

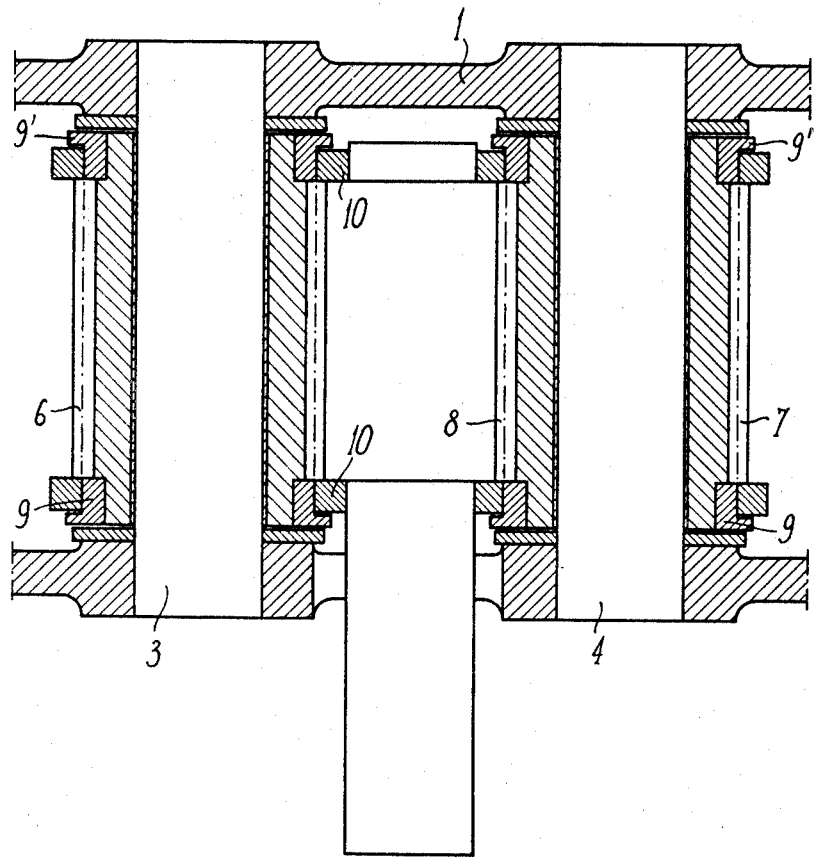

May 7, 1968 P. GAY 3,381,509
DEVICES FOR TRANSMITTING A ROTARY MOTION TO A GEAR
Filed April 6, 1966 4 Sheets-Sheet 3
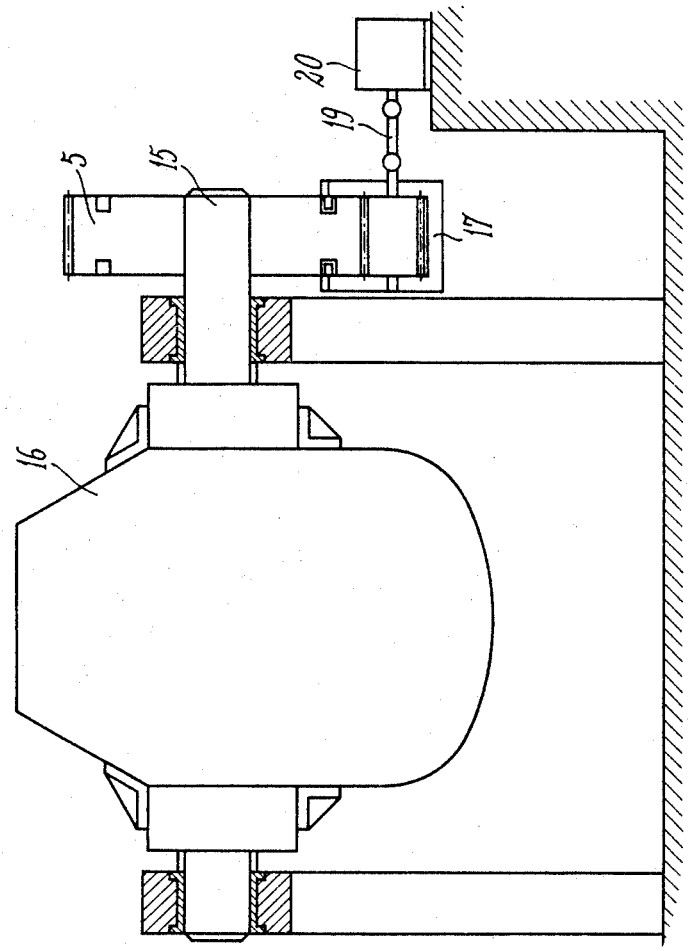
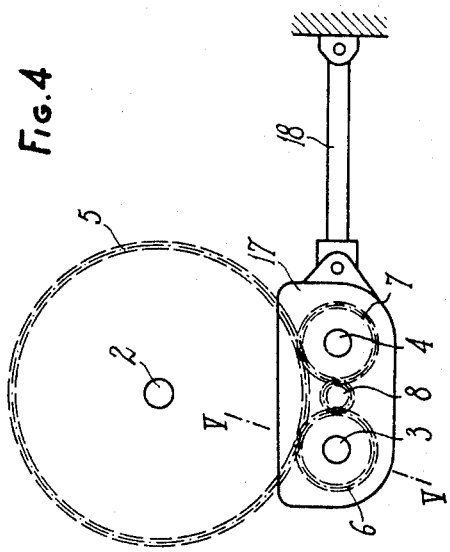

3,381,509
DEVICES FOR TRANSMITTING A ROTARY
MOTION TO A GEAR
Pierre Gay, Saint Etienne, Loire, France, assignor to Compagnie des Ateliers et Forges de la Loire (St. Chamond, Firminy, St. Etienne, Jacob-Holtzer)
Filed Apr. 6, 1966, Ser. No. 540,644
Claims priority, application France, Apr. 27, 1965, 14,733, Patent 1,465,384
4 Claims. (Cl. 74—410)

ABSTRACT OF THE DISCLOSURE

A mechanism for transmitting a rotary motion to a relatively large toothed gear. A pair of driving pinions is in constant meshing engagement with the gear and an intermediate pinion is in constant meshing engagement with both of the driving pinions. The gear and the pair of driving pinions in meshing engagement therewith are provided with shafts journaled in a case. The shaft of the intermediate pinion is free in relation to the case and the intermediate pinion is positioned in meshing engagement with the teeth of the driving pinions which mesh in turn with the gear. Flanged races are fitted on the driving pinions which coact by rolling engagement without slipping with similar races fitted on the intermediate pinion. The flanges of the driving pinion races act as abutment means to prevent any axial movement of the intermediate pinion.

---

Figure 1:
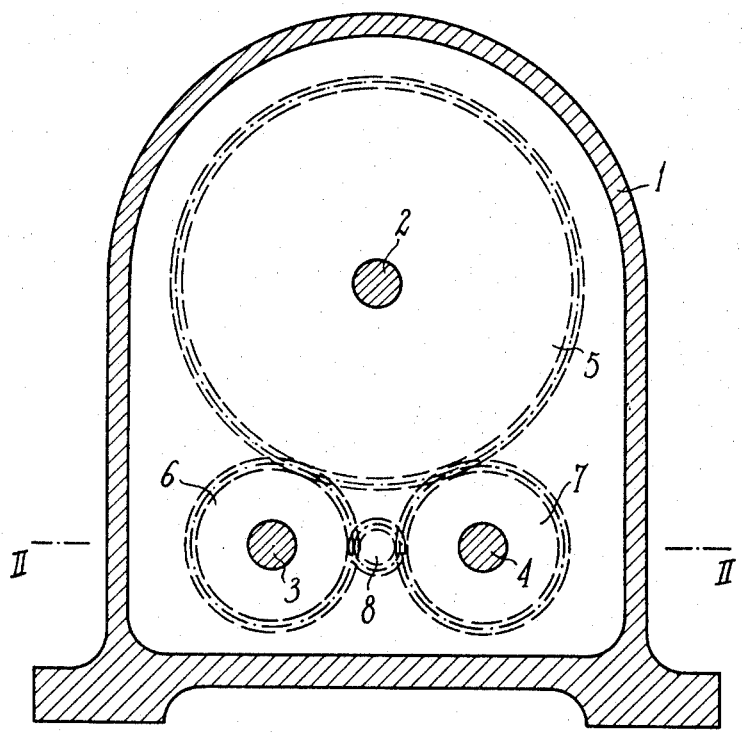

When it is desired to transmit a rotary motion to a toothed annulus or relatively large gear, the very conventional solution consisting in driving this gear by means of a pinion is usually adhered to.

If the torque to be transmitted through the annulus or large gear is relatively high and if the gear is to revolve at a relatively low speed, the gear has necessarily a large dimension and the pinion meshing therewith has a comparatively small dimension.

Under these conditions, the cost of the larger gear is the essential factor when determining the cost of the complete gear and pinion unit.

This obviously leads to the conclusion that a large gear could be driven by means of several pinions. A same wheel driven for example by two pinions can transmit a torque two times higher than that transmitted by the same wheel driven by a single pinion.

However, the difficulty encountered in mechanisms of this character resides as a rule in a proper distribution of the torques among the gears.

In known constructions of this type, differentials are used.

Now since the cost of this proper torque distribution corresponds substantially to the savings made on the gear cost, these solutions are accordingly less advantageous.

The present invention relates to an original device utilizing two pinions driving a larger gear, and such that the torques exerted by these pinions are equally distributed among them.

The device according to this invention for transmitting a rotary motion to a relatively large toothed wheel, annulus or gear is characterized in that it comprises two driving pinions in meshing engagement with said gear, an intermediate pinion meshing with said driving pinions, the contact zones between said intermediate pinion and said driving pinions being disposed symmetrically in relation to the axis of said intermediate pinion, and that said intermediate pinion, is "floating," in that no redundant means are provided for positioning it, so that the connections resulting from the meshing surfaces are not redundant either, taking into consideration the other necessary conditions.

According to an essential feature of this invention the gear and the two driving pinions meshing therewith are provided with separate shafts journaled in a case, but the shaft of said intermediate pinion is not carried by said case, the positioning of this intermediate pinion being caused by the teeth of said driving pinions meshing with said gear.

According to a specific form of embodiment of this invention, said driving pinions meshing with said large gear are provided with flanged races co-acting with similar races carried by said intermediate pinion so that they roll without relative slipping on one another, the flanges of the races carried by said driving pinions acting as abutment means to prevent said intermediate pinion from moving axially.

According to another feature characterizing this invention, the diameter of the races carried by said driving pinions meshing with said larger gear is equal to the pitch diameter of said driving pinions and the races of said intermediate pinion corresponds to the pitch diameter of this intermediate pinion.

According to another form of embodiment of this invention, the driving pinions meshing with the larger gear, and the intermediate pinion meshing with said driving pinions, are carried by a cradle guided by said larger gear by means of rollers carried by said cradle and engaging corresponding circular grooves formed in said gear, said cradle being held against peripheral motion with respect to said gear by an anchor arm pivoted at both ends.

According to another feature characterizing this specific form of embodiment of the invention, races are fitted on said gear and correspond in diameter to the pitch diameter of this gear; said gear races roll without slipping on corresponding races fitted on said driving pinions meshing with said gear, the diameter of these last-named races (which are provided with flanges acting as axial abutments to the pinions) corresponding to the pitch diameter of said driving pinions.

Other features and advantages of this invention will appear as the following description proceeds with reference to the attached drawings showing diagrammatically by way of example various forms of embodiment of the invention.

Figure 5:
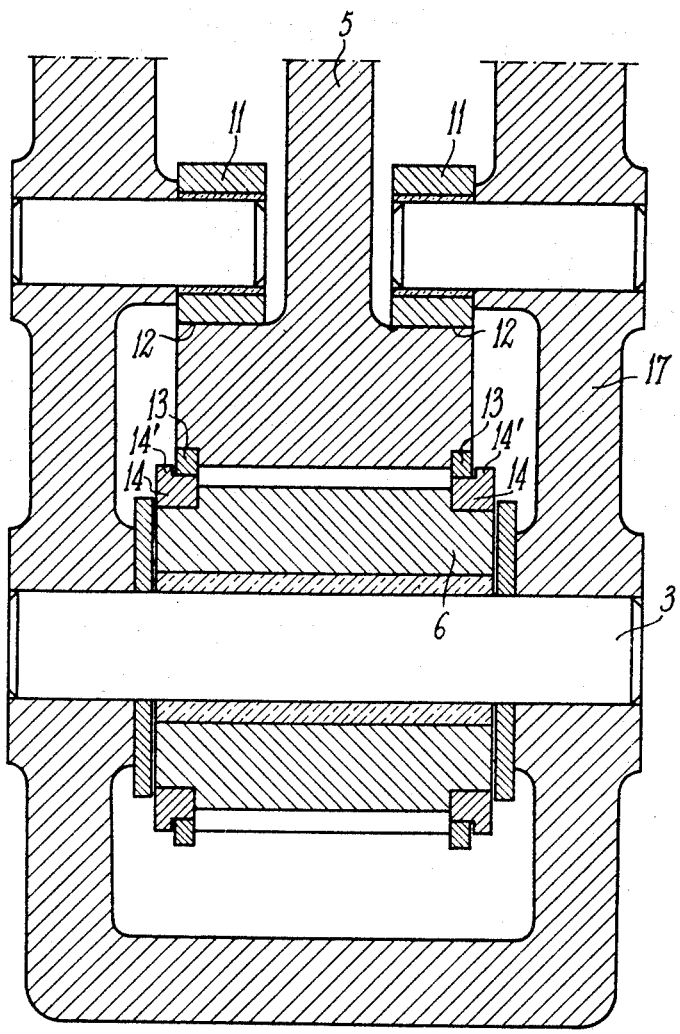

In the drawings:
FIGURE 1 is a vertical section showing a first form of embodiment of the mechanism of this invention;
FIGURE 2 is a section taken upon the line II—II of FIGURE 1;
FIGURE 3 is a fragmentary section showing another form of embodiment of this invention as applied to the tipping of a steelwork converter;
FIGURE 4 is an end vieew of the arrangement of FIGURE 3, as seen from the right-hand side, and
FIGURE 5 is a section taken upon the line V—V of FIGURE 4.

According to a first form of embodiment of the present invention, illustrated in FIGURES 1 and 2 of the drawings, a case 1 carries shafts 2, 3 and 4 on which a toothed annulus, gear or wheel 5 (called hereinafter "the gear"), to which a rotary motion is to be transmitted, and a pair of identical pinions 6 and 7 in meshing engagement with said gear, are rotatably mounted. A single pinion 8 is in constant meshing engagement with the pinions 6 and 7 and transmits the rotary motion through the medium of said pinions 6 and 7, to the gear 5.

The driving pinions 6 and 7 are disposed symmetrically in relation to the axis of the intermediate pinion 8.

The shaft of this intermediate pinion 8 is not carried by the case 1, and this intermediate pinion 8 is positioned by the teeth of said driving pinions 6 and 7.

The sectional view of FIGURE 2 shows the mounting according to this invention of the intermediate pinion 8 between the symmetric driving pinions 6 and 7.

Fitted on these driving pinions 6 and 7 are pairs of races 9 corresponding in diameter to the pitch diameter of these driving pinions. These races 9 are provided with flanges 9' clearly visible in FIGURE 2.

On the other hand, the intermediate pinion 8 has also fitted thereon two races 10 co-acting with said races 9 and having a diameter corresponding to the pitch diameter of the intermediate pinion 8 on which they are fitted.

These races 9 and 10 roll on one another without slipping and in addition the flanges 9' of races 9 hold the intermediate pinion 8 against axial motion. Therefore, the intermediate pinion 8 is not positioned by redundant connections; as a result, the reaction torques from this intermediate pinion 8 are equally distributed among the driving pinions 6 and 7. It should be noted that if the intermediate pinion 8 were mounted with its shaft rigidly journalled in the case 1, a redundant connection would result and a poor torque distribution would be obtained.

As the device according to this invention is advantageous in that it affords a reduction in the diameter of a relatively large gear, it is of particular interest to use this mechanism in a specific construction as described hereinafter.

It is already known, when driving a large-diameter toothed annulus, gear or wheel by means of a pinion, to mount this pinion on a cradle guided by the gear proper, and held against motion by an anchor arm. The device of this invention may advantageously be used in this case. A typical application of this invention to the tipping of a steelwork converter will now be described with specific reference to FIGURES 3 to 5 of the drawings.

FIGURES 3 and 4 illustrate the gear 5 keyed on the stub shaft or trunnion 15 of a converter 16. The shafts 3 and 4 of driving pinions 6 and 7, in constant meshing engagement with said gear 5, are journalled in the side plates of a cradle, trolley or like support 17 guided through rollers (to be described presently) by said gear 5. This cradle or like structure 17 is held against motion relative to the gear 5 by an anchor arm 18 pivoted at its two ends. The intermediate pinion 8 meshing with pinions 6 and 7 is floating and driven through the medium of a shaft extension 19 from a motor and reducing-gear unit 20.

FIGURE 5 shows on a larger scale a section taken upon the line V—V of FIGURE 4 containing the axes of shafts 2 and 3, of gear 5, and of driving pinion 6, to illustrate a typical form of embodiment, given by way of example, of the means provided for guiding the aforesaid cradle 17.

This cradle 17 has journalled thereon rollers 11 rolling in circular grooves 12 formed in the gear 5. This gear 5 has also fitted thereon races 13 corresponding in diameter to its pitch diameter and engaging without slipping corresponding races 14 fitted on said driving pinions 6 and 7 (only pinion 6 is visible in FIGURE 5). These races 14 correspond in diameter to the pitch diameter of their driving pinions 6 and 7 and are formed with flanges 14' to prevent any axial movements of these driving pinions 6 and 7.

As in the form of embodiment of this invention which is described hereinabove with reference to FIGURES 1 and 2, the connections concerning the intermediate pinion 8 are not redundant in this form of embodiment.

Of course, this invention should not be construed as being limited by the specific forms of embodiments shown and described herein, since many modifications and variations may be brought thereto without departing from the spirit and scope of the invention as set forth in the appended claims.

What is claimed is:

1. A mechanism for transmitting a rotary motion to a relatively large toothed gear, comprising a pair of driving pinions in constant meshing engagement with said gear, an intermediate pinion in constant meshing engagement with both of said driving pinions, wherein said gear and said pair of driving pinions in meshing engagement therewith are provided with shafts journalled in a case, the shaft of said intermediate pinion being free in relation to said case, said intermediate pinion being positioned by its meshing engagement with the teeth of said driving pinions meshing in turn with said gear, flanged races fitted on said driving pinions and coacting by rolling engagement without slippage with similar races fitted on said intermediate pinion, the flanges of said driving pinion races acting as abutment means to prevent any axial movement of said intermediate pinion.

2. A mechanism as set forth in claim 1, wherein the diameter of the rolling surfaces of said flanged races of said driving pinions is equal to the pitch diameter of said driving pinions, and the diameter of the races of said intermediate pinion is equal to the pitch diameter of said intermediate pinion.

3. A mechanism as set forth in claim 1, wherein said gear and said pair of driving pinions are provided with shafts journalled in a cradle, the shaft of said intermediate pinion being free in relation to said cradle so to constitute a floating mounting, said intermediate pinion being held in position during the operation of said mechanism by its meshing engagement with the teeth of said driving pinions meshing in turn with said gear, flanged races fitted on said driving pinions and adapted to coact by rolling engagement without slipping with similar races fitted on said intermediate pinion, the flanges of said driving pinions' races acting as abutment means to prevent any axial movement of said intermediate pinion, the diameter of the rolling surfaces of said flanged races of said driving pinions being equal to the pitch diameter of said pinions and the diameter of the races of said intermediate pinion being equal to the pitch diameter of said intermediate pinion, rollers carried by said cradle and adapted to engage corresponding circular grooves formed in said gear, in order properly to guide said cradle in relation to said gear, and an anchoring arm having one end pivotally attached to said cradle and its opposite end pivotally mounted to a fixed structure to prevent any peripheral movement of said cradle in relation to said gear.

4. A mechanism as set forth in claim 1, wherein said gear and said pair of driving pinions are provided with shafts journalled in a cradle, the shaft of said intermediate pinion being free in relation to said cradle so to constitute a floating mounting, said intermediate pinion being held in position during the operation of said mechanism by its meshing engagement with the teeth of said driving pinions meshing in turn with said gear, flanged races fitted on said driving pinions and adapted to coact by rolling engagement without slipping with similar races fitted on said intermediate pinion, the flanges of said driving pinions' races acting as abutment means to prevent any axial movement of said intermediate pinion, the diameter of the rolling surfaces of said flanged races of said driving pinions being equal to the pitch diameter of said pinions and the diameter of the races of said intermediate pinion being equal to the pitch diameter of said intermediate pinion, rollers carried by said cradle and adapted to engage corresponding circular grooves formed in said gear, in order properly to guide said cradle in relation to said gear, and an anchoring arm having one end pivotally attached to said cradle and its opposite end pivotally mounted to a fixed structure to prevent any peripheral movement of said cradle in relation to said gear, said mechanism further comprising races fitted on said gear, the diameter of the rolling surface of said races corresponding to the pitch diameter of said gear, other races fitted on said driving pinions and adapted to engage said rolling surface of said gear races without slipping, the diameter of the rolling surface of said driving pinion races being equal to the pitch diameter of said driving pinions, said driving pinion races being flanged to prevent any axial movement of said driving pinion.

References Cited

UNITED STATES PATENTS

| | | | |
|---|---|---|---|
| 2,827,798 | 3/1958 | Lucia et al. | 74—410 |
| 2,911,845 | 11/1959 | North | 74—410 |
| 3,036,475 | 5/1962 | Haupt | 74—410 |
| 3,064,490 | 11/1962 | Sigg | 74—410 |
| 3,149,499 | 9/1964 | Schmitter | 74—410 X |
| 3,206,993 | 9/1965 | Niemann | 74—411 X |
| 3,207,002 | 9/1965 | Lakin et al. | 74—411 X |
| 3,299,729 | 1/1967 | Durand | 74—410 X |

DONLEY J. STOCKING, *Primary Examiner.*

LEONARD H. GERIN, *Examiner.*